(12) United States Patent
Kirby

(10) Patent No.: US 10,579,719 B2
(45) Date of Patent: Mar. 3, 2020

(54) SYSTEM AND METHOD FOR EDITOR EMULATION

(71) Applicant: TurboPatent Corp., Seattle, WA (US)

(72) Inventor: Chad Kirby, Seattle, WA (US)

(73) Assignee: TURBOPATENT INC., Seattle, WA (US)

( * ) Notice: Subject to any disclaimer, the term of this patent is extended or adjusted under 35 U.S.C. 154(b) by 0 days.

(21) Appl. No.: 16/009,728

(22) Filed: Jun. 15, 2018

(65) Prior Publication Data

US 2018/0365203 A1 Dec. 20, 2018

Related U.S. Application Data

(60) Provisional application No. 62/520,362, filed on Jun. 15, 2017.

(51) Int. Cl.
| | | |
|---|---|---|
| *G06F 17/00* | (2019.01) | |
| *G06F 17/24* | (2006.01) | |
| *G06F 17/22* | (2006.01) | |
| *G06F 17/27* | (2006.01) | |
| *G06F 3/0481* | (2013.01) | |

(52) U.S. Cl.
CPC ........ *G06F 17/241* (2013.01); *G06F 17/2247* (2013.01); *G06F 17/2705* (2013.01); *G06F 3/0481* (2013.01)

(58) Field of Classification Search
CPC ... G06F 17/241; G06F 17/2705; G06F 3/0481
See application file for complete search history.

(56) References Cited

U.S. PATENT DOCUMENTS

| | | | | |
|---|---|---|---|---|
| 7,313,754 | B2 * | 12/2007 | McLure | G06F 17/2247 715/234 |
| 7,797,303 | B2 * | 9/2010 | Roulland | G06F 16/3329 707/713 |
| 7,912,705 | B2 * | 3/2011 | Wasson | G06F 17/241 704/9 |
| 2003/0125929 | A1 * | 7/2003 | Bergstraesser | G06F 17/2735 704/9 |
| 2003/0145282 | A1 * | 7/2003 | Thomas | G06F 8/71 715/230 |
| 2003/0167442 | A1 * | 9/2003 | Hagerty | G06F 17/218 715/201 |
| 2005/0182736 | A1 * | 8/2005 | Castellanos | G06F 17/271 705/80 |

(Continued)

*Primary Examiner* — Laurie A Ries
(74) *Attorney, Agent, or Firm* — Rowan Tels LLC

(57) ABSTRACT

A method including applying a text file to a browser window to operate a text pre-processor on the text file to generate pre-processed text, selecting a plurality of rule sets from a control memory structure, parsing properties from the pre-processed text to generate a word property map, configuring an evaluator with the rule sets to compare the word property map to each of the rule within the plurality of rule sets to insert a plurality of annotations within the word property map to convert it into an annotation map. The annotation map is applied to an editor emulator to insert instructions into the text file to configure a second user interface to display the plurality of annotations within the text file, identifying each annotation as associated with its antecedent rule set.

12 Claims, 5 Drawing Sheets

(56) References Cited

U.S. PATENT DOCUMENTS

| | | | | |
|---|---|---|---|---|
| 2005/0240393 A1* | 10/2005 | Glosson | ............... | G06F 17/24 704/8 |
| 2006/0136194 A1* | 6/2006 | Armstrong | ............ | G06F 16/367 704/4 |
| 2009/0154337 A1* | 6/2009 | Kim | ................... | H04L 43/0811 370/216 |
| 2009/0292660 A1* | 11/2009 | Behal | ..................... | G06N 20/00 706/12 |
| 2012/0150920 A1* | 6/2012 | Roulland | ............. | G06F 16/367 707/805 |
| 2013/0317994 A1* | 11/2013 | Tran | .................... | G06Q 50/184 705/310 |
| 2014/0163955 A1* | 6/2014 | Ng Tari | ............ | G06F 17/2785 704/9 |
| 2016/0148159 A1* | 5/2016 | Coffing | ................ | G06Q 10/10 705/301 |
| 2017/0357631 A1* | 12/2017 | Desai | ................. | G06F 17/2705 |

\* cited by examiner

SYSTEM AND METHOD FOR EDITOR EMULATION

CROSS-REFERENCE TO RELATED APPLICATIONS

This application claims benefit under 35 U.S.C. 119 to U.S. application Ser. No. 62/520,362 filed on Jun. 15, 2017, and incorporated herein by reference in its entirety.

BACKGROUND

Traditionally, proofreading was done by people, but with the advent of computers has become increasingly automated. While computers are often more efficient, they lack a human element, which may lessen the user's experience. User experience is very important to the usability of computerized tools. There are a variety of different disciplines and applications which may require specific formatting and error checking against several sets of well-defined rule. While these changes can currently be made and documented within word processing devices, the experience is often cumbersome and monolithic, requiring users to view all changes made by a system in a manner that is difficult to distinguish between rule sets and lacks the more inviting user experience of interacting with a human being.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
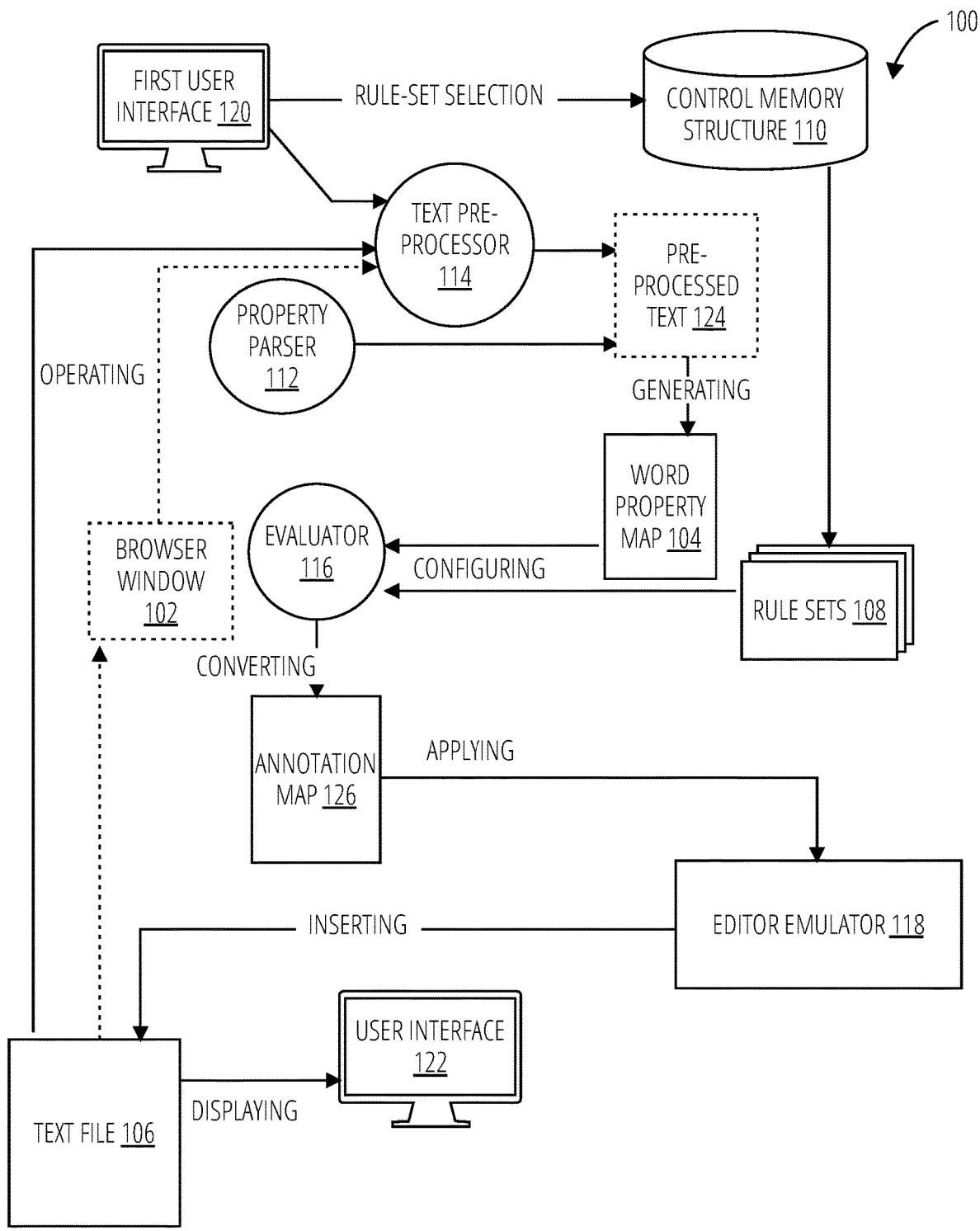
FIG. 1 illustrates an embodiment of a system for editor emulation 100.

"evaluator" in this context refers to logic to compare text and text structure against a set of rules to determine whether a rule applies to the text and to indicate that it does within a change map.

"term property element" in this context refers to a meta-data/markup element to store properties corresponding to a given word or set of words. These may be treebank properties, or other properties indicating changes made to the word during preprocessing.

"rule set identifier" in this context refers to a unique identifier for a rule set to associate an alert to the rule set it was generated from.

"treebank string" in this context refers to a string annotating the structure, properties and contents of a word set. Generally, a tagged text, where tokens are tagged with part-of-speech tags. This may comprise utilizing Penn Treebank Tags, or other tags to denote properties of a sentence and annotating a string with those tags. For example, the following portion of a sentence "encoder deluxe computes a value" may be annotated with the following tags: VP—Verb Phrase, NP—Noun Phrase, DT—Determiner, NN—Noun, singular or mass, VBZ—Verb, 3rd person singular present and converted into the following treebank string: (NP (NN encoder) (NN deluxe)) (VP (VBZ computes) (NP (DT a) (NN value)))

"problem word sets" in this context refers to a word or set of words that have been identified as being difficult to parse or translate. These may be words or phrases with multiple or ambiguous meanings requiring additional context to process their meaning properly.

"substitution word sets" in this context refers to a word or words known to be a good substitution for a problem word set to circumvent meaning parsing issues associated with the problem word set.

"rule set" in this context refers to a set of rules that may be applied to text to trigger actions based on the content of the text.

"markup treebank" in this context refers to a treebank utilizing markup tags to denote the individual properties for a word or word set (for example, treebank tags). This may be executed in XML or another markup language.

"text file" in this context refers to a file containing information that may be read by a computer to display text on a user interface. For example, files used in word processing. These may be files containing additional markup and style information about the text beyond the characters themselves.

Description

A document may be compared to rule sets that contain information about how information must be structured within a document to help automate document proofreading. For example, a profession may require specific order and formatting for certain documents as well as having requirements dictating the content of the documents. In order to ensure better and faster generalized proofreading, computer-based systems have been employed to accomplish the work of a support staffer or editor. Emulating a human response, utilizing existing channels for communication, allows for domain-specific proofreading and compliance checking to be more easily incorporated into existing user workflows and tools, while simultaneously improving the user experience by simulating a human interaction and also allowing the user a more organized way to view suggested edits. For example, this allows for individual rule sets to be associated with an individual "editor" and the user may easily determine the types of edits or comments (e.g., which rule set is the antecedent (i.e., preceding in time or order) rule set for that edit or comment) that have been suggested based on which "editor" made the correction. By encouraging the user to anthropomorphize the computer program modules, it allows the user to feel like they are interacting with a person and receiving feedback in a more natural way. Additionally, it may allow the user to focus negative reactions on the individual "editor" and not on the system as a whole, which allows the user to have a more positive overall experience.

Further, pre-processing is applied to the text file to allow for a more accurate parse and processing by an NLP engine. This further allows the system and method to interact with the user more naturally, and successfully, returning higher-quality editing work while maintaining a user experience closer to one where the user is utilizing staff to perform the same task.

For example, consider the following case:

'encoder 200 computes a value'.

VP—Verb Phrase

VB—Verb, base form

NP—Noun Phrase
CD—Cardinal Number
NNS—Noun, plural
DT—Determiner
NN—Noun, singular or mass Here, an NLP parser may incorrectly parse the phrase and return this:

"(VP (VB encoder) (NP (CD 200) (NNS computes)) (NP (DT a) (NN value)))",

Here, the reference sign has been dissociated from the 'encoder'.

In order to counteract this, a substitution for the reference sign may be used. Here, for example, an NN noun being swapped for the CD reference number will give a proper parse into a treebank string:

(NP (NN encoder) (NN deluxe)) (VP (VBZ computes) (NP (DT a) (NN value)))

In order to maintain the data within the text, a tag may be used to show that this substitution will takes place at this position: (RS 200). This allows this problem word set to be swapped for the substitution word set (NN deluxe) without the loss of information. To further save space, strings may be further compressed to the tag and a shorter string of text to represent each word, for example, the first letter of each word in a phrase may be used:

(NP (NN encoder) (NN deluxe)) (VP (VBZ computes) (NP (DT a) (NN value)))

would become:

(NP (NN e) (NN d)) (VP (VBZ c) (NP (DT a) (NN v)))

Based on the order of the words and phrases and the first letter, and having the original text, it allows additional adjustments or tags to be added and the text mapped back to its original form without the loss of data. The treebank string may be converted into a markup treebank and the term property elements in the markup treebank may be added to the text to store the term properties.

```
let problem word sets = [
[regex],
[regex],
[ 'problem word', 'known substitution word' ],
[ 'problem word sets', 'replacement substitution word sets' ],
];
```

Referring to FIG. 1, the system for editor emulation 100 comprises a browser window 102, a word property map 104, a text file 106, a rule sets 108, a control memory structure 110, a property parser 112, a text pre-processor 114, an evaluator 116, an editor emulator 118, a first user interface 120, a user interface 122, a pre-processed text 124, and an annotation map 126. The text file 106 may be applied to the browser window 102 to generate a control signal to operate the text pre-processor 114. A text pre-processor 114 may receive a control signal from the first user interface 120 to operate the text pre-processor 114. The control memory structure 110 receives a rule-set selection from a first user interface 120 to select a rule sets 108 from the control memory structure 110. The text file 106 may be applied to the browser window 102 and generate a control signal to operate the text pre-processor 114 to generate a pre-processed text 124. The property parser 112 is operated with the pre-processed text to generate a word property map 104. The evaluator 116 is configured with the rule sets 108, to generate a plurality of annotations and converting the word property map 104 into an annotation map 126 by inserting the plurality of annotations into the word property map. The evaluator 116 applies the annotation map 126 to the editor emulator 118 to insert instructions into the text file 106 to configure a user interface 122 to display the plurality of annotations within the text file, identifying each annotation as associated with its antecedent rule set. The text file 106 may be a word processing file format that supports additional markup (for example xml) of the text.

The rule set applied may check for compliance with order, formatting, grammar, which may be defined by the specific use case. For example, one use could apply a rule set to ensure that items are properly introduced with an indefinite article before being referred to with a definite article.

This may require that the evaluator apply a set of rule determine whether a given definite article of a word is properly introduced. For example a 'component' may be used to define a word that is important for determining whether one phrase resolves to another phrase. In practice, the component words are all of the nouns, verbs, adjectives, etc., but none of the articles, conjunctions, and other glue words. A 'required' component is one that is not optional. Generally, required components may exclude components found in parenthetical or restrictive sub-phrases. For example, in the phrase 'a plurality of monkeys', 'plurality' is required, but 'monkeys' is optional because it is in a restrictive sub-phrase. As a result, the reference 'the plurality' would resolve to 'a plurality of monkeys'. In this example, 'the plurality' could be a valid reference if there were no other pluralities of other things in the same context.

The 'last required component' may be the last element in the list of required components. Generally, the last required component is the smallest possible string that could possibly resolve a reference to an intro. For example, in the phrase 'a car that is blue', the last required component is 'car', so 'the car' would be a resolvable reference, but 'the blue' would not be. 'Restrictive components' are those components that are optional because they are found in some restrictive sub-phrase of this phrase. Restrictive components are used to resolve references in cases where the required components are insufficient. For example, in a context having 'a plurality of [monkeys]' and 'a plurality of [meerkats]', we need to use restrictive components to determine that 'the plurality of [monkeys]' is a valid reference. Restrictive components also allow the phrase 'the [blue] car' to resolve to 'a car that is [blue]'.

```
checkIfResolves(candidate) {
    list = getListOfRequiredStems( );
    check distance to candidate;
    compare candidate to list;
    if (multiplePossibleIntros){
        check more restrictive options;
    }
}
```

The system for editor emulation 100 may be operated in accordance with the process outlined in routine 518.

Figure 2:
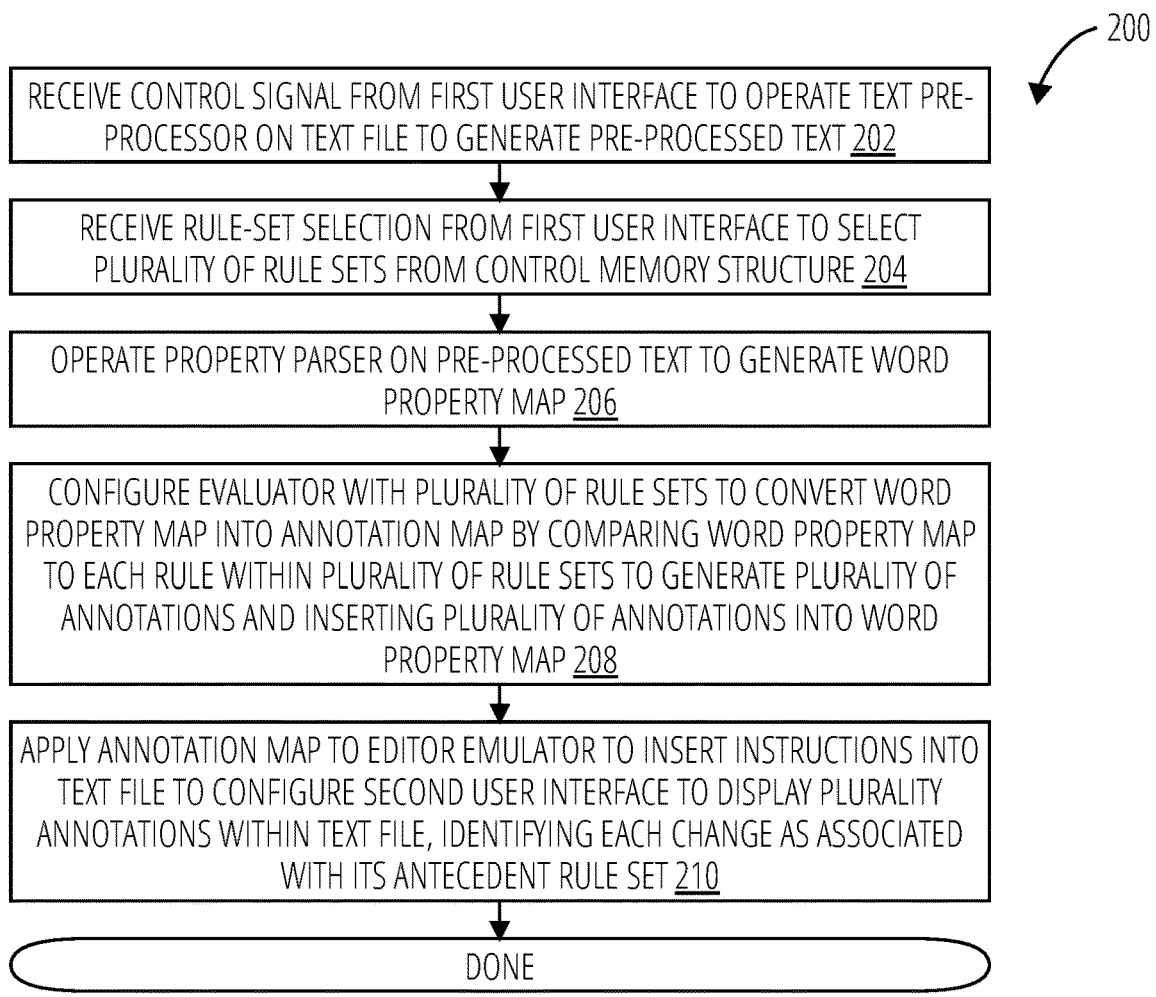
FIG. 2 illustrates an embodiment of an editor emulation process 200.

Referring to FIG. 2, the editor emulation process 200 receives a control signal from a first user interface to operate a text pre-processor on a text file to generate pre-processed text. (block 202)

A control memory structure receives a rule-set selection from the first user interface to select a plurality of rule sets from a control memory structure. (block 204)

A property parser operates on the pre-processed text to generate a word property map. (block 206)

An evaluator is configured with the plurality of rule sets to convert the word property map into an annotation map by comparing the word property map to each rule within the plurality of rule sets to generate a plurality of annotations and inserting the plurality of annotations into the word property map. (block 208)

The annotation map is applied to an editor emulator to insert instructions into the text file to configure a second user interface to display the plurality annotations within the text file, identifying each change as associated with its antecedent rule set. (block 210)

A method may include receiving a control signal from a first user interface to operate a text pre-processor on a text file to generate pre-processed text, receiving a rule-set selection from the first user interface to select a group of rule-sets from a control memory structure and operating a property parser on the pre-processed text to generate a word property map. An evaluator may be configured with the group of rule-sets to convert the word property map into an annotation map by comparing the word property map to each rule within the group of rule-sets to generate a group of annotations which are then inserted into the word property map, and/or applying the annotation map to an editor emulator to insert instructions into the text file to configure a second user interface to display the group of annotations within the text file, identifying each annotation as associated with its antecedent rule set.

An annotation generated from its antecedent rule set may be identified as associated with that rule set via a rule set identifier.

Generating the pre-processed text may further include identifying problem word sets, then mapping the problem word sets to substitution word sets, parsing the text to generate a treebank string, converting the treebank string to a markup treebank, adding term property elements to the text to store term properties, adding properties from the markup treebank to the term properties, and/or mapping the substitution word sets back to the problem word sets. The problem word sets may further include ambiguous words. The identification of the problem word sets may further include pattern matching to known problem words.

Figure 3:
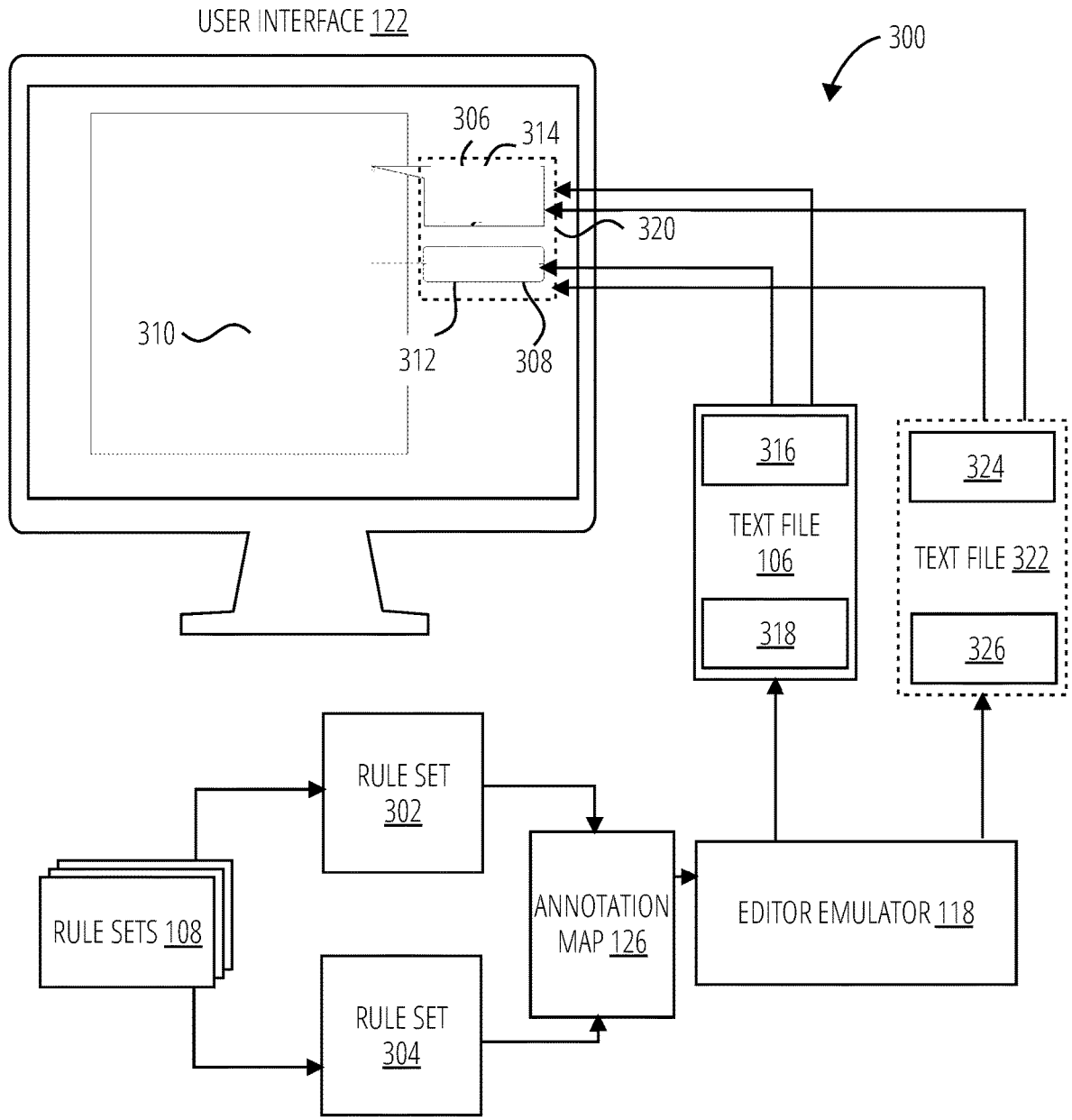
FIG. 3 illustrates an embodiment of an editor emulation system 300.
Figure 4:
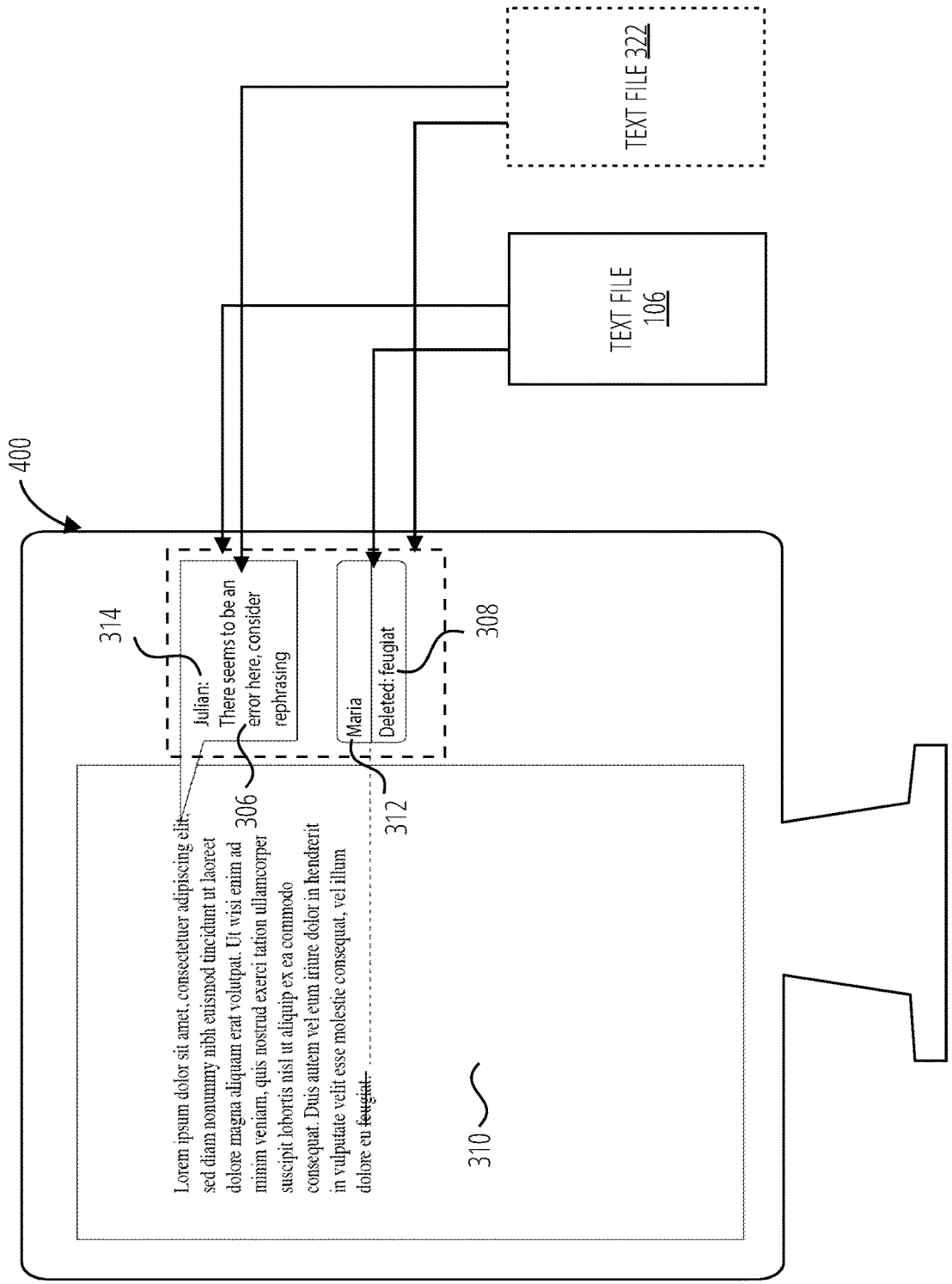
FIG. 4 illustrates a user interface 400 in accordance with the editor emulation system 300.

Referring to FIGS. 3-4, the editor emulation system 300 comprises a text file 106, rule sets 108, an editor emulator 118, a user interface 122, an annotation map 126, a rule set 302, a rule set 304, a text file 310, a rule set identifier 312, a rule set identifier 314, an annotation 320, and a text file 322.

The text file 322 further comprises a structured section of text 324, and a main corpus of text 326.

The text file 106 further comprises the structured section of text 316 and main corpus of text 318.

The annotation 320 further comprises text change 308 and comment 306.

The rule sets 108 further comprise the rule set 302 and the rule set 304. The rule set 302 and the rule set 304 may be used to generate the annotation map 126. The annotation map 126 is applied to the editor emulator 118 to insert instructions into the text file 106 to display the text change 308 and the comment 306 within the text file. The user interface 122 displays the text file 106 as the text file 310 with the text change 308 and the comment 306.

The user interface 122 may display the text file 322 as the text file 310 with the text change 308 and the comment 306.

The text change 308 is identified as being associated with the rule set 304 by the rule set identifier 312. The comment 306 is identified as being associated with the rule set 302 by the rule set identifier 314.

The editor emulator 118 may generate the second text file 322, from the annotation map 126 and may contain the annotation 320. The annotations in the annotation map 126 and the text file 106 are generated from the rule set 302 and rule set 304, and the rule set 302 and rule set 304 may compare the structured section of text 316 and the structured section of text 324 to the main corpus of text 318 and the main corpus of text 326 respectively, to determine conceptual support for the structured section of text 316 in the main corpus of text 318.

For example, the structured section of text 316 and the structured section of text 324 may refer to "a widget" but the main corpus of text 318 and main corpus of text 326 respectively, never discusses the widget.

The annotation 320 may be identified from a particularly structured section of text 324 utilizing stemmed words to identify a lack of introduction (introduction) for a word used in the structured section of text 324 (e.g., if the structured section of text 324 referred to "the widget" without first introducing the referred to component).

FIG. 4 illustrates an exemplary user interface 400 in accordance with an embodiment utilizing the editor emulation system 300. The user interface 400 comprises a comment 306, a text change 308, a text file 310, a rule set identifier 312, and a rule set identifier 314.

Figure 5:
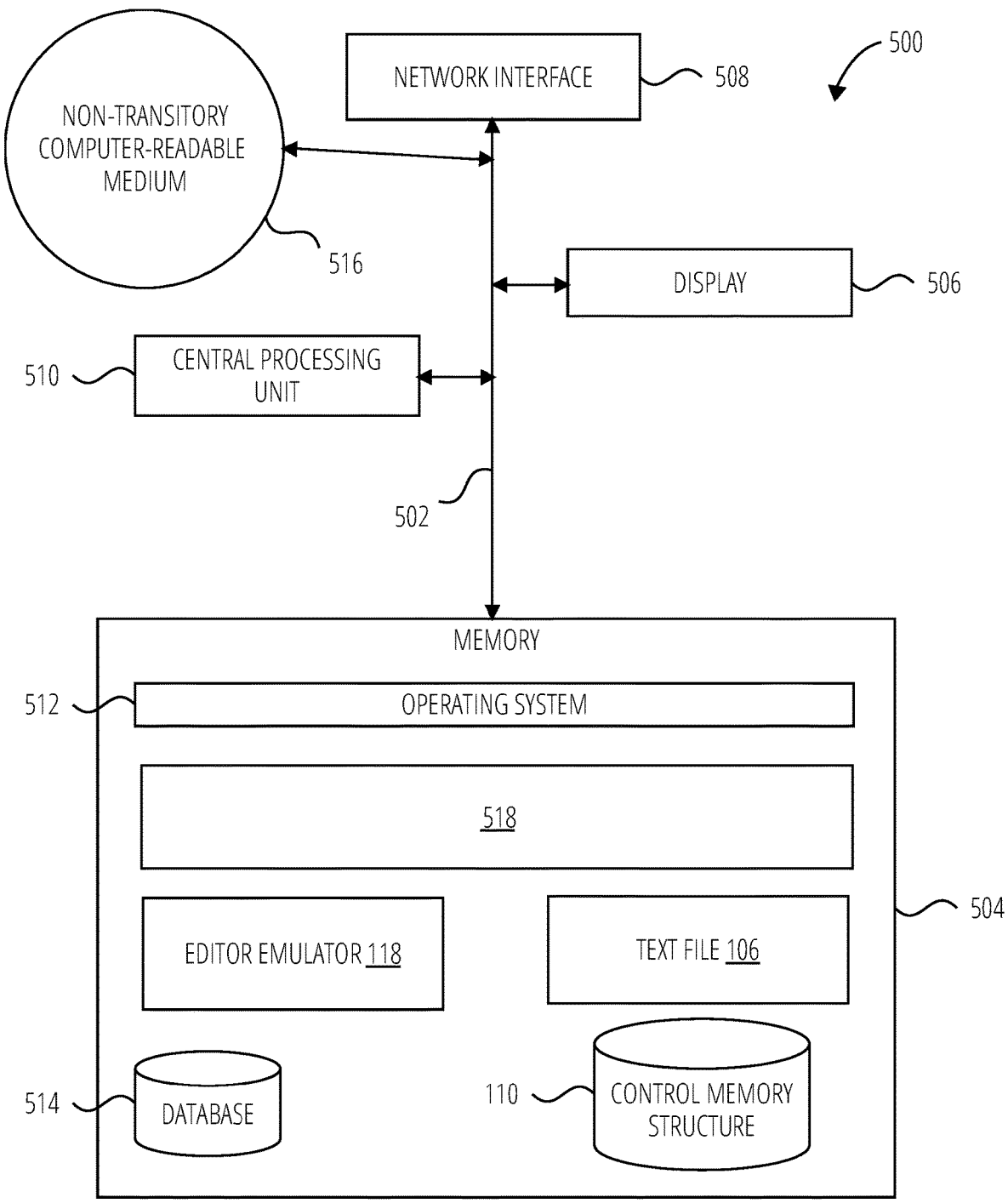
FIG. 5 illustrates a system 500 in accordance with one embodiment.

FIG. 5 illustrates several components of an exemplary system 500 in accordance with one embodiment. In various embodiments, system 500 may include a desktop PC, server, workstation, mobile phone, laptop, tablet, set-top box, appliance, or other computing device that is capable of performing operations such as those described herein. In some embodiments, system 500 may include many more components than those shown in FIG. 5. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 500 may comprise one or more physical and/or logical devices that collectively provide the functionalities described herein. In some embodiments, system 500 may comprise one or more replicated and/or distributed physical or logical devices.

In some embodiments, system 500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 500 includes a bus 502 interconnecting several components including a network interface 508, a display 506, a central processing unit 510, and a memory 504.

Memory 504 generally comprises a random access memory ("RAM") and permanent non-transitory mass storage device, such as a hard disk drive or solid-state drive. Memory 504 stores an operating system 512.

These and other software components may be loaded into memory 504 of system 500 using a drive mechanism (not shown) associated with a non-transitory computer-readable medium 516, such as a DVD/CD-ROM drive, memory card, network download, or the like.

Memory 504 also includes database 514. In some embodiments, system 500 may communicate with database 514 via network interface 508, a storage area network ("SAN"), a high-speed serial bus, and/or via the other suitable communication technology.

In some embodiments, database 514 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

One of skill in the art will realize that the methods and apparatuses of this disclosure describe proscribed functionality associated with a specific, structured graphical interface. Specifically, the methods and apparatuses, inter alia, are directed to creating an annotation map by generating a plurality of annotations using an evaluator, applying the annotation map to an editor emulator that inserts instructions into a text file to configure a second user interface to display the plurality of annotations within a text file, thereby identifying each change as associated with its antecedent rule set. One of skill in the art will realize that these methods are significantly more than abstract data collection and manipulation.

Further, the methods provide a technological solution to a technological problem, and do not merely state the outcome or results of the solution. As an example, a document may be compared to rule sets which contain information about how information must be structured within a document to help automate document proofreading. This allows for individual rule sets to be associated with an individual "editor" and the user may easily determine the types of edits or comments that have been suggested based on which "editor" made the correction. This is a particular technological solution producing a technological and tangible result. The methods are directed to a specific technique that improves the relevant technology and are not merely a result or effect.

Additionally, the methods produce the useful, concrete, and tangible result of creating an annotation map by generating a plurality of annotations using an evaluator, applying the annotation map to an editor emulator that inserts instructions into a text file to configure a second user interface to display the plurality of annotations within a text file, thereby identifying each change as associated with its antecedent rule set.

Further, the methods are directed to a specifically-structured graphical user interface, where the structure is coupled to specific functionality. More specifically, the methods disclose a specific set of information to the user, rather than using conventional user interface methods to display a generic index on a computer.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A method comprising:
    receiving a control signal from a first user interface to operate a text pre-processor on a text file to generate pre-processed text, by:
        identifying problem word sets;
        mapping the problem word sets to substitution word sets;
        parsing the text file to generate a treebank string;
        converting the treebank string to a markup treebank;
        adding term property elements to the text file to store term properties;
        adding properties from the markup treebank to the stored term properties; and
        mapping the substitution word sets back to the problem word sets;
    operating a property parser on the pre-processed text to generate a word property map;
    converting the word property map into a text annotation map by comparing the word property map to each rule within a plurality of rule sets to generate a plurality of text annotations and inserting the plurality of text annotations into the word property map; and
    inserting instructions into the text file to configure a second user interface to display the plurality of text annotations within the text file.

2. The method of claim 1, wherein the text file is ingested through a web browser and the editor emulator generates a second text file containing the annotations.

3. The method of claim 1, wherein the text file further comprises a corpus of text and a particularly identified structured set of text, and the annotations identify a lack of conceptual support for the particularly identified structured set of text within the corpus of text.

4. The method of claim 1, wherein the annotation generated from its antecedent rule set is identified as associated with that antecedent rule set via a rule set identifier.

5. The method of claim 1, wherein the problem word sets comprise ambiguous words.

6. The method of claim 1, wherein the identification of the problem word sets comprises pattern matching to known problem words.

7. A computing apparatus, the computing apparatus comprising:
    a processor; and
    a memory storing instructions that, when executed by the processor, configure the apparatus to:
        receive a control signal from a first user interface to operate a text pre-processor on a text file to generate pre-processed text by:

identifying problem word sets;
mapping the problem word sets to substitution word sets;
parsing the text to generate a treebank string;
converting the treebank string to a markup treebank;
adding term property elements to the text to store term properties;
adding properties from the markup treebank to the stored term properties; and
mapping the substitution word sets back to the problem word sets;
receive a rule-set selection from the first user interface to select a plurality of rule sets from a control memory structure;
operate a property parser on the pre-processed text to generate a word property map;
configure an evaluator with the plurality of rule sets to convert the word property map into an annotation map by comparing the word property map to each rule within the plurality of rule sets to generate a plurality of annotations and inserting the plurality of annotations into the word property map; and
apply the annotation map to an editor emulator to insert instructions into the text file to configure a second user interface to display the plurality of annotations within the text file, identifying each annotation as associated with its antecedent rule set.

8. The computing apparatus of claim 7, wherein the text file is ingested through a web browser and the editor emulator generates a second text file containing the annotations.

9. The computing apparatus of claim 7, wherein the text file further comprises a corpus of text and a particularly identified structured set of text, and the annotations identify a lack of conceptual support for the particularly identified structured set of text within the corpus of text.

10. The computing apparatus of claim 7, wherein the annotation generated from its antecedent rule set is identified as associated with that antecedent rule set via a rule set identifier.

11. The computing apparatus of claim 7, wherein the problem word sets comprise ambiguous words.

12. The computing apparatus of claim 7, wherein the identification of the problem word sets comprises pattern matching to known problem words.

\* \* \* \* \*